United States Patent [19]
Hunt et al.

[11] 3,868,869
[45] Mar. 4, 1975

[54] AUTOMATIC TRANSMISSION CONTROL SYSTEMS

[75] Inventors: Norman Hunt; John Noddings, both of Cawston, England

[73] Assignee: Associated Engineering Limited, Warwickshire, England

[22] Filed: Jan. 8, 1973

[21] Appl. No.: 321,677

[30] Foreign Application Priority Data
Jan. 14, 1972 Great Britain...................... 1963/72

[52] U.S. Cl..................... 74/866, 74/867, 74/752 A
[51] Int. Cl............................................. B60k 23/02
[58] Field of Search .......... 74/752 A, 866, 336, 867

[56] References Cited
UNITED STATES PATENTS

| | | | |
|---|---|---|---|
| 3,604,288 | 9/1971 | Mori................................ | 74/866 X |
| 3,641,844 | 2/1972 | Wakamatsu et al. ............. | 74/866 X |
| 3,710,630 | 1/1973 | Sumiyoshi et al................ | 74/867 X |
| 3,732,755 | 5/1973 | Beig et al............................. | 74/866 |
| 3,738,193 | 6/1973 | Sumiyoshi et al................ | 74/866 X |
| 3,750,495 | 8/1973 | Ito et al. .............................. | 74/866 |

*Primary Examiner*—Samuel Scott
*Assistant Examiner*—P. S. Lall
*Attorney, Agent, or Firm*—Brisebois & Kruger

[57] ABSTRACT

The invention relates to a system for controlling an automatic transmission of a road vehicle. The system includes a valve member movable between first and second positions, at one of which positions the valve member allows pressurised fluid to pass to operate a friction-engaging element of the transmission in one direction, and at the other position the valve member vents the fluid to operate the friction-engaging element in the opposite direction. The valve member is moved in at least one direction by the application of pressurised fluid controlled by an electrically-operated solenoid valve. The invention also relates to the particular electrical operation of the solenoid valve.

20 Claims, 14 Drawing Figures

AUTOMATIC TRANSMISSION CONTROL SYSTEMS

This invention relates to automatic transmission control systems.

According to one aspect of the invention there is provided an automatic transmission control system, including a valve member movable between first and second positions at one of which positions the valve member allows pressurised fluid to pass to operate a friction-engaging element of the transmission in one direction, and at the other position, the valve member vents the fluid to operate the friction-engaging element in the opposite direction, and in which the valve member is moved in at least one direction by the application of pressurised fluid controlled by an electrically-operated solenoid valve. Conveniently the valve member is moved in the other direction by a spring.

Two valve members may be biased apart to opposite ends of their travel by the spring which acts upon both valve members.

Preferably at least one of the valve members is moved by fluid pressure, when its respective solenoid valve passes pressurised fluid, into abutment with the other valve member.

Suitably, the valve member is a spool valve, slidable in a bore, and having at least two cylindrical sealing lands with an intermediate waisted portion, whereby to open and close at least one port in the wall of the bore.

The valve member may be divided transversely into two portions kept in abutment, whereby to accommodate slight irregularity in the bore or the valve member.

Conveniently, at least one of the sealing lands has a tapered portion joining the, or each, cylindrical land to the waisted portion, whereby to reduce the rate at which the port is closed or opened as the valve member moves.

According to another aspect of the invention, an automatic transmission control system includes a solenoid valve to control the supply of fluid for operating a friction-engaging element of the transmission to effect changes of drive ratio, and means to supply pulses of electricity to the solenoid valve for a period after initiation of a change of drive ratio.

Preferably at the end of the said period the solenoid is supplied with continuous current if de-energised immediately before the said period and vice versa.

The mark/space ratio and/or frequency and/or duration of the period of the pulses may be different on upward changes of ratio from downward changes of ratio, and may also be varied in dependance on parameters such as speed, torque, throttle opening or manifold depression of an engine by which the transmission is driven, or by speed of a load driven by the transmission.

According to a further aspect of the invention and automatic control system includes a solenoid valve to control the supply of fluid for operating a frictionengaging element of the transmission to effect changes of drive ratio, and a delay circuit to delay the supply of electricity to the solenoid valve or to delay the cutting off of electricity from the solenoid valve after initiation of a change of drive ratio.

Preferably in a change of drive ratio, the supply of electricity to one solenoid valve is delayed after the supply of electricity is cut off from another solenoid valve. Alternatively, the cutting off at the supply of electricity from one solenoid valve is delayed after the supply of electricity to another solenoid valve.

According to another aspect of the invention, an automatic transmission incorporates any of the above-mentioned control systems and is arranged to provide a plurality of different drive ratios, and in which failure of the supply of electricity to any of the energised solenoid valves will cause any ensuing change of ratio to be to a ratio nearer direct drive.

Figures 1, 4:
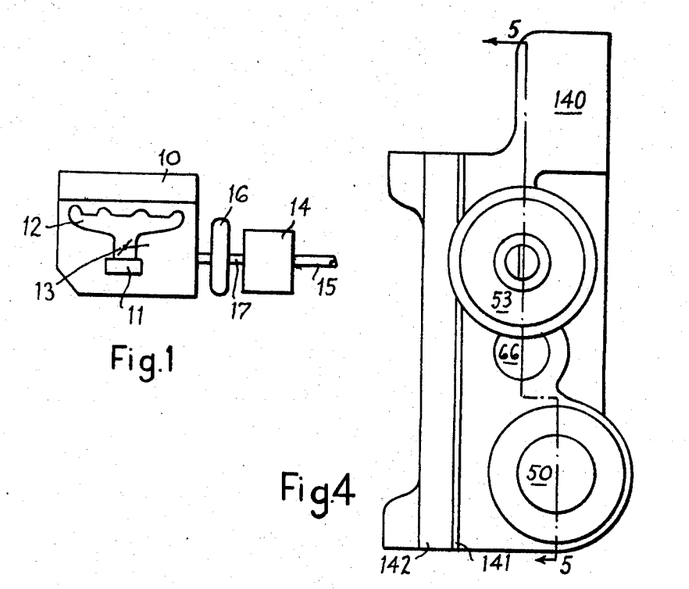
FIG. 1 is a diagrammatic elevation of an engine and automatic transmission.
FIG. 4 is an end view of FIG. 3.

The invention is described, by way of example only, with reference to the accompanying drawings, in which:

FIG. 1 shows a four-cylinder internal combustion piston engine 10, which is fed with combustible mixture controlled by a throttle valve 13, in known manner.

The engine 10 drives a load (not shown) such as the wheels of a motor vehicle, through an automatic transmission 14 to be described later. The automatic transmission 14 is connected to the load through an output shaft 15. The engine 10 drives the automatic transmission 14 through a hydro-dynamic coupling or torque converter 16, connected to the input shaft 17 of the automatic transmission 14.

Figure 2:
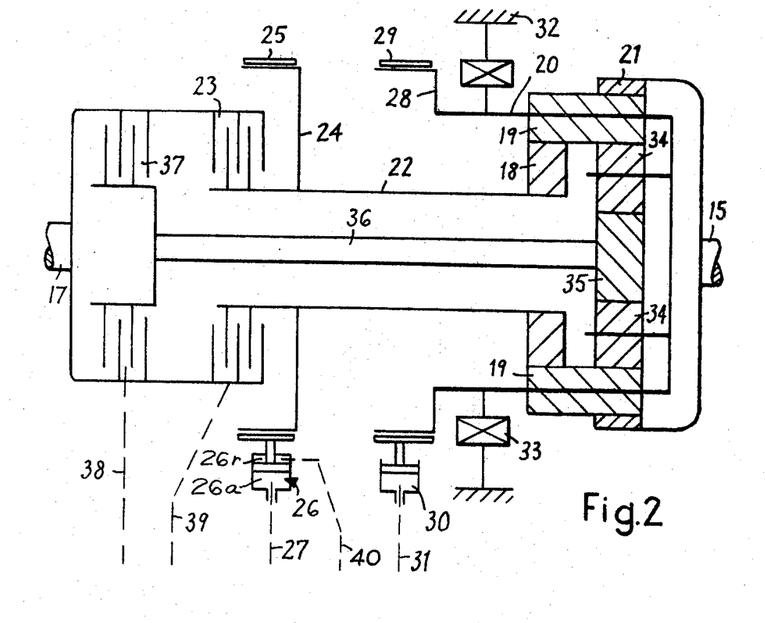
FIG. 2 is a diagrammatic layout of the automatic transmission in longitudinal section.

FIG. 2 shows in diagrammatic form the lay-out of a typical automatic transmission 14, arranged to provide one direct and two reduction forwards ratios, and one reverse reduction ratio. Details of construction of the automatic transmission shown in FIG. 2 will be well known to those versed in the art of transmissions.

In FIG. 2, a front single epicyclic gear set consists of a front sun gear 18 meshing with an appropriate number, such as three, planet gears 19 carried on a planet carrier 20. The planet gears 19 mesh with an annulus gear 21, which is connected to the output shaft 15. The front sun gear 18 is connected by a sleeve 22 through a friction-engaging element comprising a multi-plate hydraulically-operated rear clutch 23 to the input shaft 17. The sleeve 22 is connected to a front drum 24 around which is provided a front brake band 25, which is contracted onto the front drum 24 to bring it to rest when hydraulic pressure is applied to the apply side 26a of the cylinder of a front servo 26 through a feed line 27.

The planet carrier 20 is connected to a rear drum 28 which can be braked to rest by a rear brake band 29 operated by a rear servo 30, the cylinder of which is fed through a hydraulic feed line 31. The planet carrier 20 is also connected to the automatic transmission case 32 by an over-run clutch or free-wheel 33 arranged to permit the planet carrier 20 to rotate in a forwards direction whilst inhibiting reverse rotation of it.

The planet gears 19 are meshed with a set of intermediate planet gears 34 also carried on the planet carrier 20. The intermediate planets 34 mesh with a rear sun gear 35 which is connected by an intermediate shaft 36 and a further frictionengaging element comprising a front multi-plate clutch 37 to the input shaft 17. The front clutch 37 and rear clutch 23 are engaged by pressurized oil, fed through respective feed lines 38,39.

The front clutch 37, rear clutch 23, front brake 25 and rear brake 29 are all spring-loaded to the disengaged position; however, the release side 26r of the cylinder of the front servo 26 of the front brake 25 is arranged to be fed through a further feed line 40, in such a way that simultaneous application of the same oil pressure along the feed lines 27 and 40 will disengage the servo 26, in known manner.

Pressurized oil for engaging the front and rear clutches 37, 23, and for actuating the front and rear servos 26, 30, to engage the brakes 25,29 as well as pressurized oil for lubricating the automatic transmission and for filling and pressurizing the torque converter 16, is obtained from a conventional positive displacement pump (not shown), driven by the engine or the casing of the torque converter 16.

To obtain engagement of the various drive ratios, pressurized oil is fed to the front and rear clutches 37, 23 and the front and rear servos 26, 30 in the following combinations:

| | | |
|---|---|---|
| Direct drive | | Front clutch, rear clutch |
| Intermediate | | Front clutch, front servo |
| Low hold | | Front clutch, rear servo |
| Low automatic | (free wheel on over-run) | Front clutch |
| Reverse | | Rear servo, rear clutch |
| Neutral | | |

Figure 5:
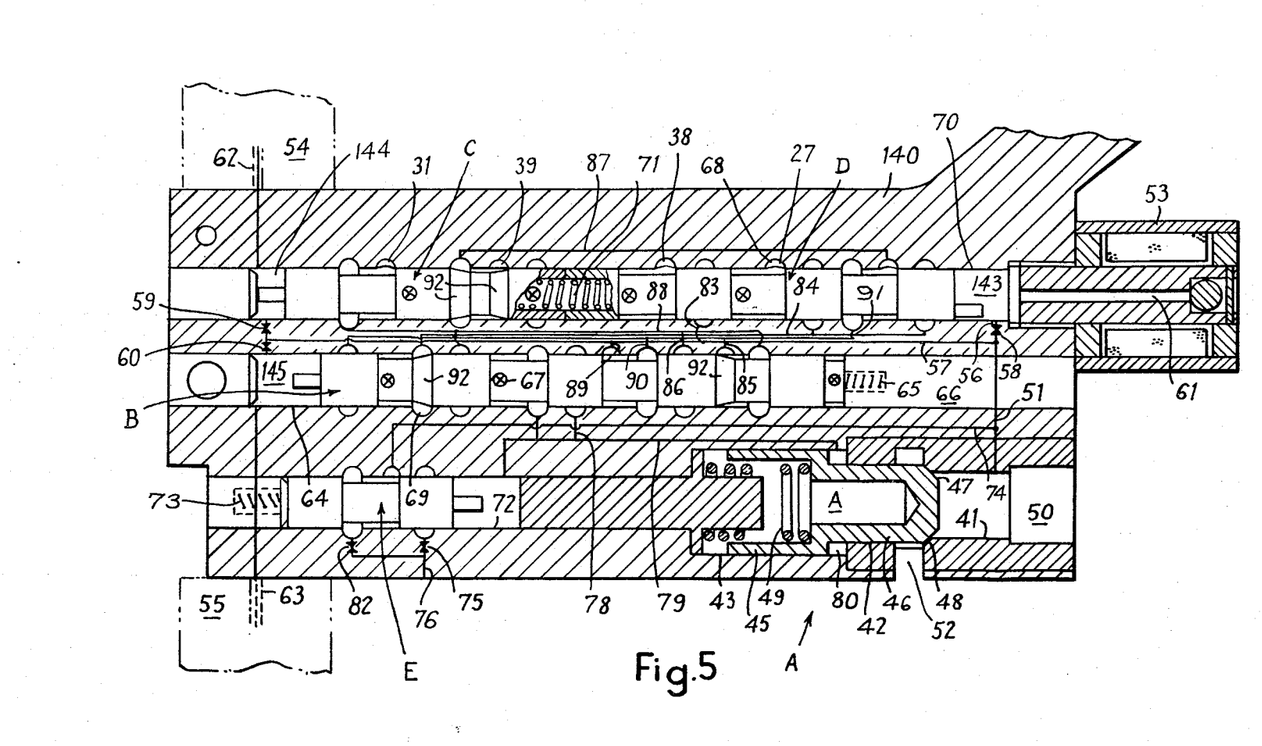
FIG. 5 is a section along the line 5—5 in FIG. 4.

The distribution of pressurised oil to the various clutches and servos, the regulation of operating oil pressure, and the control of oil flow to the torque converter, are effected by means of the control system shown in FIGS. 2, 4 and 5. This system has four valves which incorporate spool valve members B,C,D and E and a pressure regulating valve incorporating a valve member A, shown in FIG. 5. The valves members are typically of steel, slidable in bores in a die-cast aluminium block 140 to which a separator plate 141 and a cover 142 are fastened.

The bore in which the pressure regulator valve members A is slidable has three concentric portions 41, 42, 43. The valve member A has a land 45 engaged in the bore portion 43, joined by a land 46 engaged in the bore portion 42 to a frusto-conical end 47 which engages against a corner 48 formed at the junction of the bore portion 41 and 42. The corner 48 has a conical seating formed thereon, although it may alternatively be sharp. The valve member A is urged against the corner 48 by a pre-loaded helical compression spring 49 acting between one end of the bore portion 43, which is plugged, and the left hand end of the valve member A. Pressurised oil from the pump is fed into the outer end of the bore portion 41 via an inlet 50, causing the valve member A to be displaced from the position shown, against the force of the spring 49 to separate the end 47 from the corner 48, thereby achieving a substantially constant oil pressure in an outlet line 51. Oil which passes the corner 48 is returned to the sump of the automatic transmission through a drain line 52.

Oil outlet line 51 feeds three spaces 143, 144, 145, at the end of the bores in which the valve members D,C and B respectively are slidable through lines 56, 57 and restrictors 58, 59, 60. The pressure in the spaces 143, 144 and 145 is controlled by solenoid valves 53, 54, 55 which are preferably of the type shown in FIG. 1 of our co-pending British Patent Application No: 1962/72. Solenoid valves of this type allow pressurized oil to pass to their respective outlet lines 61, 62, 63 when they are de-energised, but when the solenoid valves are energised with electricity, their outlet lines are blocked causing the pressure in the spaces 143, 144 or 145 to rise. Other types of solenoid valves which achieve the same result may be used, in which case the restrictors 58, 59 and 60 may not be necessary.

The valve member B is slidable in a bore 64, and is biased to the left-hand position in FIG. 5 from the position shown, by a pre-compressed coil spring 65. When the space 145 is pressurised, the valve member B is moved to the right hand position as shown, where it abuts a plug 66 fast in the righthand end of the bore 64. The valve member B and five sealing lands axially separated by intermediate waisted portions. Since the valve member B is always in compression by virtue of either the spring 65 or oil pressure applied to its left hand end, it may be divided transversely into two parts, at an appropriate waisted portion, to accommodate any slight bowing of the bore 64 or the valve member B.

The valve block is provided with drain connections to the automatic transmission sump, as shown for example at 67. It is also provided with ports formed as radial bores or similar apertures, as shown for example at 68. Certain ports are pressure-balanced and extend in the bore 64 all round the valve member B, in known manner, as shown for example at 69.

The valve members C and D, and the types of ports provided, are generally similar to those described with reference to the valve members B. Valve member C has three sealing lands, and valve member D has four sealing lands. The valve members C and D are biased apart towards opposite ends of the bore 70 by a pre-compressed coil spring 71 fitted in recesses in the adjacent ends of the valve members C and D. When no oil pressure is provided to the spaces 143, 144 the valve member C is biased to the left hand position shown while the valve member D is biased to a right hand position. When the pressurized oil is fed to the space 143, both valve members C and D are moved to the left hand position as shown, whilst, when space 143 is vented and space 144 is pressurized, the valve members C and D are moved to a right hand position. It will be apparent that the valve member C controls the opening and closing of the ports connected to the feed line 31 of the rear servo 30, the feed line 39 of the rear clutch 23 and the feed line 40 of the release side 26r of the front servo 26 of FIG. 2, whilst the valve member D controls the ports connected to the feed lines 38 and 27 of the front clutch 37 and to the apply side 26a of the front servo 26 respectively.

A further bore 72 in the valve block has a valve member E slidable therein. The valve E has two sealing lands and is biased on the right from the position shown by a pre-compressed spring 73. In this right hand position, oil from the line 51 passes along line 74, into theh bore 72 around the waisted portion of the valve member E, and out of the bore through a restrictor 75 along a line 76 to fill and pressurise the torque converter (16 in FIG. 1) to around 20 p.s.i. (pounds per square inch).

When the automatic transmission is in low or intermediate gear, it is subject to high input torques from the torque converter, and sustains high reaction torques, necessitating the application of high operating oil pressure to the front clutch and front servo, typically of 180 p.s.i. However, in direct gear, where most driving is done, such pressure is unnecessary and the operating pressure is therefore reduced to around 90 p.s.i. This is achieved by feeding the pressurized oil back along lines 78 and 79 to a cavity 80 at the junction of the land 45 and 46 of the pressure regulating valve member A and the junction of the bore portions 42 and 43. The force generated by the pressure in cavity 80 acts to the left on the valve member A, and opposes the force due to the spring 49, whereby the operating oil pressure in the line 51 is reduced.

Line 79 also feeds oil to the right hand end of the bore 72 which moves valve member E to the left hand position shown. In this position pressurized oil from the line 74 is fed to the torque converter through an alternative restrictor 82 and line 76. The restrictor 82 is arranged to maintain the torque converter oil pressure in the line 76 at around 20 p.s.i. even though the main operating oil pressure has been halved.

Figure 3:
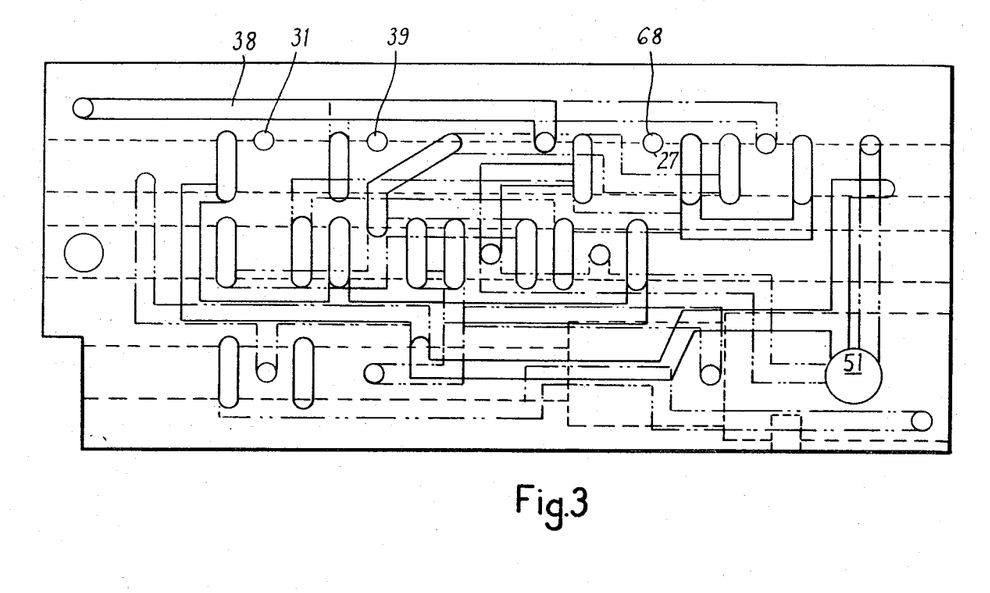
FIG. 3 is a plan view of a control system for the automatic transmission, showing the various oil passageways or lines thereof.

FIG. 3 shows the various passageways or lines in the control system, the passageways which are formed in the main body 140 being shown in solid lines, and those passageways which are formed in the cover 140 and/or separator plate 141 being shown in chain dotted lines.

The supply of pressurized oil to the front clutch 37, rear clutch 23, the front servo 26 and the rear servo 30 to engage the various drive ratios is as follows:
Neutral Solenoid valve 53 energised (closed). All clutches and servos drained.
Low automatic Solenoid valves 54 and 55 energised (closed) Front clutch 37 engaged through lines 57, 83 and 38.
Intermediate Solenoid valve 54 energised (closed). Front clutch engaged as above. Front servo 26 engaged through lines 57, 85, 86, 84 and 27 connected to front servo apply side 26a.
Direct No solenoid valves energised (all open). Front clutch engaged as above. Rear clutch 23 engaged through lines 57,85,86,84,87 and 39. Front servo disengaged through lines 39 to 40 connected to the front servo release side 26r
Low hold Solenoid valve 55 energised (closed). Front clutch engaged as before. Rear servo engaged through lines 57, 85, 88 and 31.
Reverse Solenoid valves 53 and 55 energised (closed) Rear clutch engaged through lines 57, 89, 90, 91, 87 and 39. Rear servo engaged as above.

If the gear ratios are considered as a series extending from reverse through neutral, low and intermediate to direct, it will be seen that failure of the supply of electric current to any of the solenoid valves 53, 54, 55 when any gear is engaged will cause a change in ratio towards direct, thereby providing a fail-safe mode of operation.

Energisation of the solenoids 53, 54, 55 is determined in reverse, neutral and low hold by a suitable manually-operated selector switch. In automatic drive, the ratio changes depend on a combination of road-speed and engine torque, and a suitable system to control the supply of electric current to the solenoid valves is disclosed in our co-pending British Patent Application No: 11,280/70.

Due to the rapid response usually achieved in solenoid valves 53, 54, 55, the valve members B,C and D tend to move from one operating position to the other very rapidly, causing corresponding rapid opening and closing the various ports, particularly the pressure balanced ports. Since the volume of oil fed to and from the front and rear clutches and front and rear servos is small, the changes in operating pressure also tend to occur very abruptly, which may generate undesirably sharp changes of drive ratio. To reduce the rate of pressure change, the sharp corner is removed from those lands of valve members B and C which control the flow of oil to and from the clutches and servos, for example by providing tapered portions 92, which may be conical, or of other suitable shape.

It has been found that the use of the tapered portions 92 are of particular benefit when, during changes of drive ratio, the solenoid valves 53, 54, or 55 are operated by successive pulses of electric current, whereby to modify the rate of change of pressure in the clutches and servos, as described hereinafter.

In certain modes of operation of the automatic transmission, for example when the engine 10 is at idling speed, there may be an inadequate flow of pressurised oil from the pump. To conserve this flow, it may be preferred to reduce the supply of oil to the torque converter 16 and to the lubrication system of the automatic transmission 14. In this alternative arrangement, which is not illustrated, the cavity to the right hand side of valve member E / is fed direct from the line pressure by being connected to line 74 in FIG. 5. The spring 73 makes the valve member E cut off the port feeding the restrictor 82 up to, say, 50 p.s.i., when it starts to open: the valve member E thereby acts as a preliminary pressure control valve, inhibiting flow of oil to the torque converter and lubrication system up to that pressure. Restrictor 75 is blanked off in this arrangement.

Figure 6:
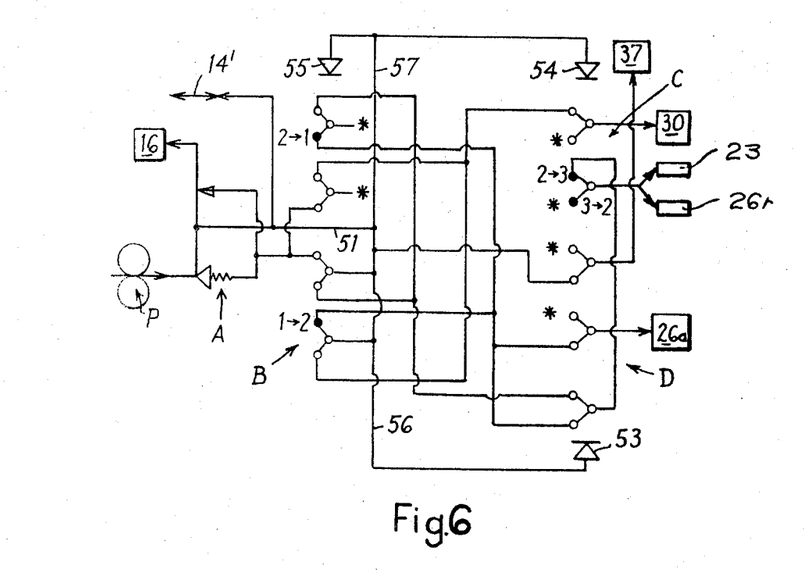
FIG. 6 is a diagrammatic layout of the control system shown in FIGS. 3, 4 and 5.

FIG. 6 is a diagrammatic lay-out, or a logic circuit, of the control system shown in FIGS. 3, 4, 5. In FIG. 6, the ports controlled by the valves members B,C and D are shown as circles arranged in groups of three. The centre port of each group is connected to the upper port of its group when the respective valve member is in the upper position in FIG. 6, and is connected to the lower port of its group when the valve member is in the lower position. Ports controlled by the tapered lands 92 are shown in blacked-in circles, and the drain ports 67 are marked with an asterisk. In this Figure the oil pump is shown diagrammatically at P, and the line for feeding lubricating oil to the automatic transmission is indicated 14'.

Figure 7:
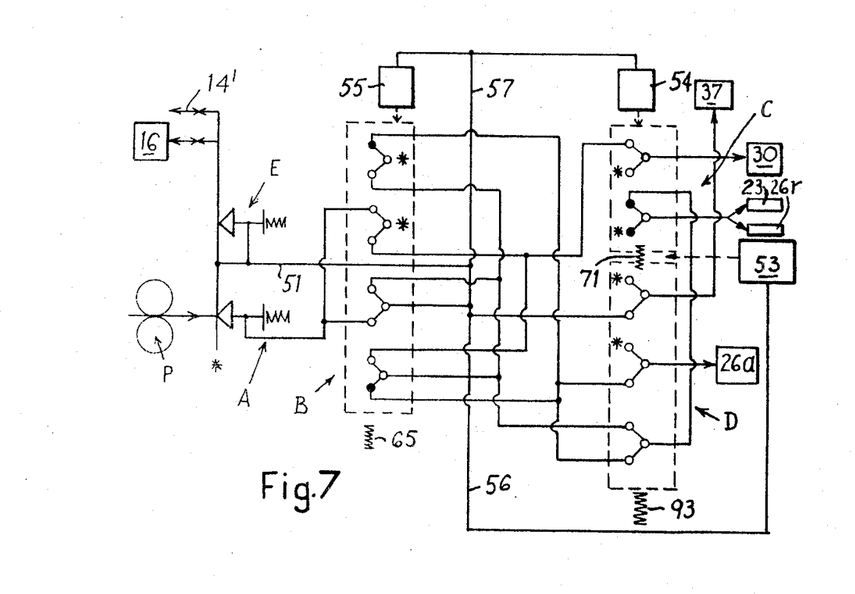
FIG. 7 is a diagrammatic layout of an alternative control system to that shown in FIG. 6.

FIG. 7 shows a logic circuit, similar to FIG. 6, of a control system which is structurally similar to that shown in FIGS. 3, 4 and 5, except that the ports and their inter-connections are re-arranged. A further difference is that the solenoid valve 53 now feeds to the space between the valve members C and D so as to force them apart with pressurized fluid, and a further spring 93 is provided. This circuit is preferably used with solenoid valves 53, 54, and 55, of the type shown in FIG. 2 of our British Patent Application No: 1962/72, or any other type which passes pressurised fluid when not energised with electricity, but which vents its output lines when energised. the spring 71 is now provided so that when both solenoid valves 53 and 54 are not energised, the valve member C will be moved to its upward position in FIG. 7. The references 26r and 26a signify front servo release and front servo apply, respectively, and 14' is a lubricant supply line.

Using the circuit shown in FIG. 7, the supply of pressurised oil to the front clutch 37, rear clutch 23, the front servo 26 and the rear servo 30, to engage the various drive ratios is as follows:

| | |
|---|---|
| Neutral | Solenoid valves 53 and 54 energised. |
| Low automatic | Solenoid valves 53 and 55 energised. |
| Intermediate | Solenoid valve 53 energised. |
| Direct | Solenoid valve 54 energised. |
| Low Hold | Solenoid valves 54 and 55 energised. |
| Reverse | Solenoid valves 53, 54, 55 energised. |

FIGS. 8, 9, 10 and 11 show electrical circuits which are combined to operate a single one of the solenoid valves 53, 54 or 55. The electrical circuits incorporate operational amplifiers and NAND gates which are conveniently integrated circuits whose internal arrangements will be well understood by those versed in the art, and need not be discussed further.

Figure 8:
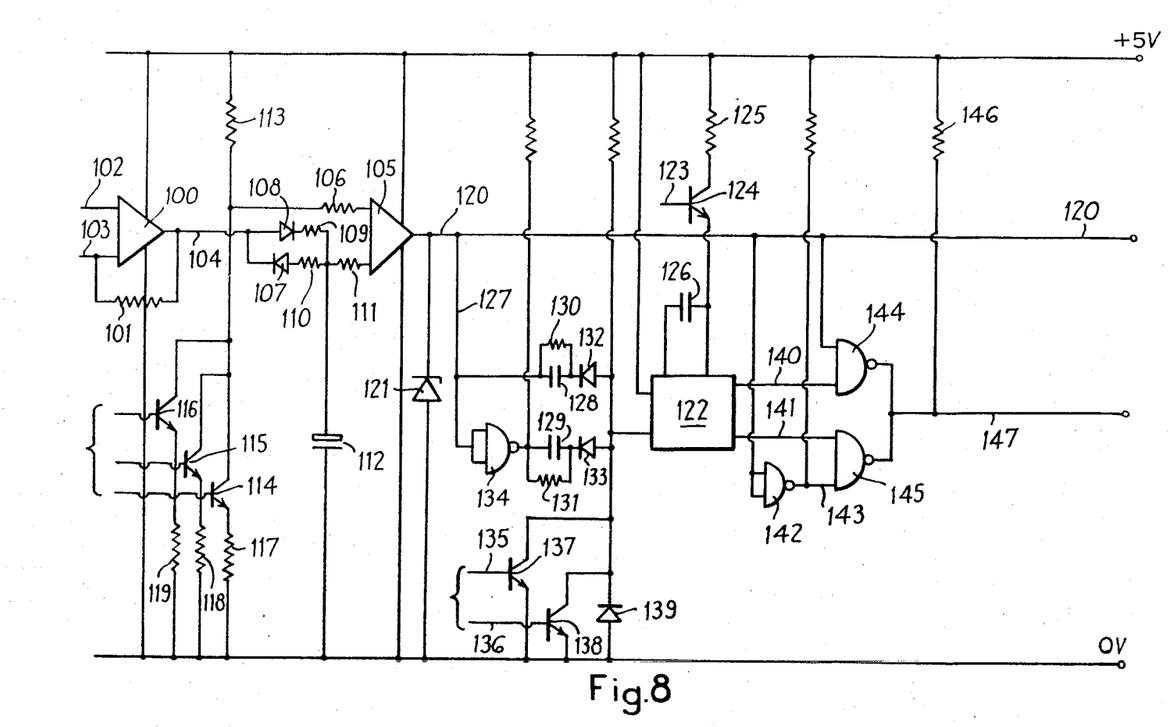
FIGS. 8, 9 10 and 11 are diagrams of electrical circuits for controlling the supply of electricity in the control system.
Figure 11:
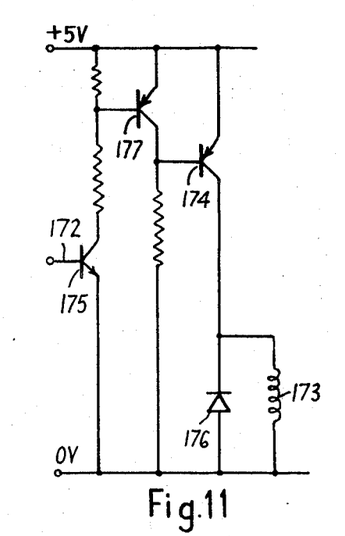
Figure 12:
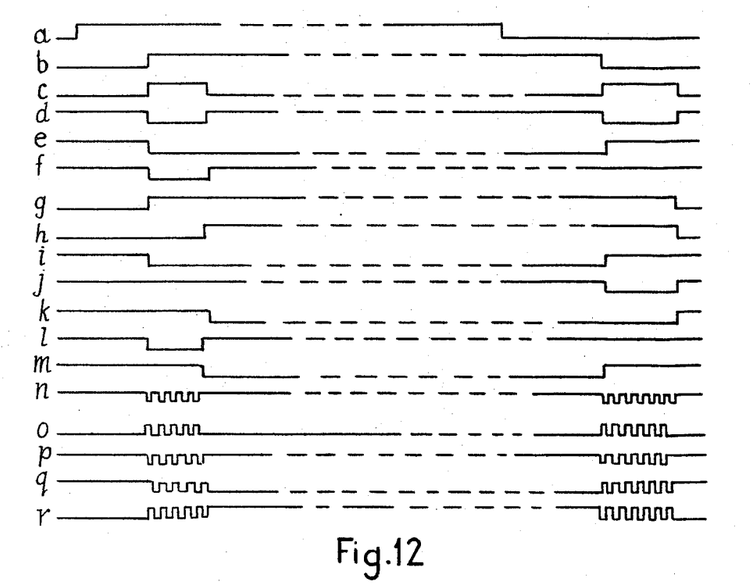
FIG. 12 is a logic diagram illustrating the function of various parts of FIGS. 8 to 11.

FIG. 12 shows the form of the electrical current to a base of time at various points through the circuits shown in FIGS. 8 and 11.

The change in electrical current, to one of the solenoid valves, to effect a change of gear ratio, is initiated by the supply of electrical current to the input of the circuit shown in FIG. 8. This electric current may be provided by a manually-operated switch, in the case where the driver determines where the gear change is to occur. Alternatively, the electrical current may be supplied automatically at a time which is determined by various operating parameters of the engine or vehicle. A system for this purpose is disclosed in our British Patent Application No. 11,280/70, at the output of which a comparator, comprising an operational amplifier 100 and resistor 101, (equivalent to items 13 and 22 in FIG. 2 of the last mentioned Patent Application) is fed by two lines 102, 103 with signals depending for example on vehicle speed and engine torque. At an appropriate time, the comparator 100 starts to emit an electrical current along the line 104, as shown by the step-up in FIG. 12a. This electrical current continues until the conditions are such that the comparator 100 ceases to emit, as shown by the step-down in FIG. 12a.

It is often desirable to delay the supply of pressurised oil to a clutch or servo, or the venting of oil from it, during a gear change, in relation to the operation of another clutch or servo in the automatic transmission, in order to achieve a smooth change of ratio. For this purpose, the current step-up in FIG. 12a is delayed, as shown in FIG. 12b, and the current step-down is delayed by a different amount. These delays are effected by a delay circuit in FIG. 8 consisting of an operational amplifier 105 fed by a reference voltage through resistor 106, and a slowly rising voltage provided by diodes 107, 108, resistors 109, 110 and 111, and a condenser 112. The diodes 107, 108 provide a differing rate of rise from the rate of fall of the voltage in resistor 111. The control voltage in resistor 106 is determined by a resistor 113 and one or more control voltage inputs comprising transistors 114, 115, 116 connected through resistors 117, 118, 119. Each transistor 114, 115, 116 has an input fed by a control voltage which is varied by some varying parameter which requires a corresponding change in the delay of operation of the solenoid valve, for example engine torque, vehicle speed or transmission temperature.

It will be seen that FIG. 12b represents the output voltage of the operational amplifier 105 in line 120. This line is connected to the zero voltage line through a 5 volt Zener diode 121, so that the voltage in line 120 will be either zero or 5 volts.

In addition to the delays in feeding oil to and from the clutches or servos, it is often desirable to provide further cushioning during a gear change by controlling the rate of flow of oil for a pre-determined period. This is achieved by feeding the solenoid valves 53, 54, 55 with a train of electrical pulses during this pre-determined period, rather than merely switching the solenoid valves on or off. The pulse train period is determined by a monostable circuit 122, the pulse train period being different for an upchange compared with a downchange, and being determined by a control voltage fed along line 123 to a transistor 124 connected by a resistor 125 and condenser 126. The monostable 122 is triggered through line 127 and a pulse steering circuit, which produces negative pulses to trigger the monostable irrespective of whether the change in voltage of line 120 is upwards or downwards. The pulse steering circuit comprises condensers 128, 129, resistors 130, 131, diodes 132, 133 and a NAND gate 134. In some circumstances it may be desirable to effect a virtually instantaneous gear change by reducing the pulse train period to zero: this is done by feeding control voltage lines 135, 136 connected to transistors 137, 138 and a diode 139.

The monostable 122 has an output line 140, in which the voltage is shown in FIG. 12c, and a further output line 141 in which the voltage is the inverse of that in line 140, as shown in FIG. 12d.

The voltage in line 120 is inverted by a NAND gate 142 having an output line 143, of which the voltage is shown in FIG. 12e. The voltage in lines 120 and 140 are fed to a NAND gate 144, whilst the voltages in lines 141 and 143 are fed to a NAND gate 145. The output of NAND gate 144 is shown in FIG. 12f, and the output of NAND gate 145 is shown in FIG. 12g. The outputs of NAND gates 144 and 145 are joined with a resistor 146 to form an OR gate, of which the output in line 147 is shown in FIG. 12h. The 0 volt and 5 volt lines, and lines 120 and 147 are continued at the input of FIG. 9.

Figure 9:
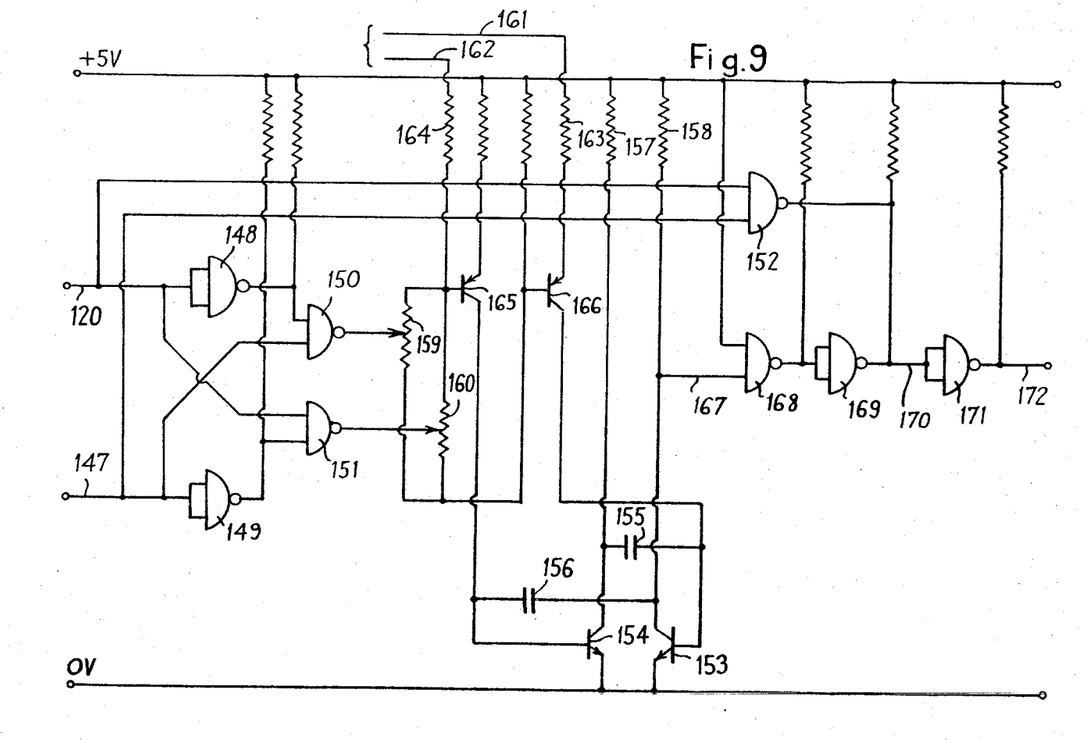

In FIG. 9, the voltages in lines 120 and 147 are inverted by NAND gates 148, 149 respectively, their outputs being shown in FIGS. 12i and 12k. The output of NAND gate 148 and the voltage in line 147 are fed to a NAND gate 150 of which the output is shown in FIG. 12j. Similarly, the output of NAND gate 149 and the voltage in line 120 are connected to a NAND gate 151 of which the output is shown in FIG. 12l. The voltages in lines 120 and 147 are also fed to a NAND gate 152 of which the output is shown in FIG. 12m.

The outputs of the NAND gates 150, 151 control the length of pulse trains emitted from an oscillator comprising transistors 153, 154, condensers 155, 156 and resistors 157, 158. The NAND gates 150, 151 feed through pre-set resistors 159, 160 to determine the mark/space ratio of the pulses, which may be different on an up-change from a down-change. The pulse frequency and/or mark/space ratio may be adjusted in dependance on external parameters, such as engine torque, speed or transmission temperature, by means of control voltages derived therefrom and fed along lines 161, 162 through resistors 163, 164 to transistors 165, 166.

The pulses from the oscillator are fed along a line 167 in which the voltage is shown in FIG. 12n. The 5 volt line and line 167 are fed to a NAND gate 168 of which the output is shown in FIG. 12o, and this is inverted by a NAND gate 169 of which the output is shown in FIG. 12p. The outputs of NAND gates 152 and 169 are combined in line 170, as shown in FIG. 12q, and this is inverted by a NAND gate 171 having an output line 172 in which the voltage is shown in FIG. 12r. Line 172 is connected to the appropriate solenoid valve 53, 54, or 55.

Figure 10:
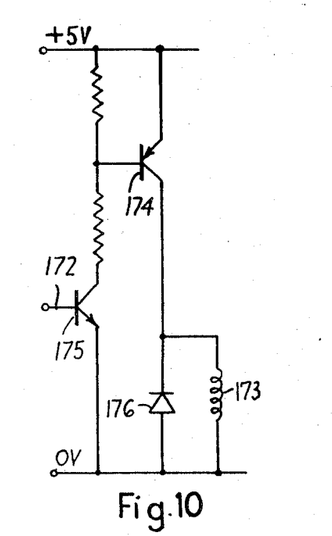

The output of FIG. 9 feeds the circuits shown in FIGS. 10 or 11. In FIG. 10, operating current through the winding 173 of the solenoid valve 53, 54 or 55 is switched by a power transistor 174, which in turn is controlled by a driver transistor 175 connected to line 172. The winding 173 is bridge by a diode 176. When there is a voltage in line 172, current will flow through the winding 173.

In FIG. 11, the circuit is arraged to pass current through the winding 173 whenever there is no voltage in the line 172. This is achieved by an inverting transistor 177 connected between the driver transistor 175 and the power transistor 174. If preferred, an electromagnetic relay may be used in place of the power transistor 174.

Figure 13:
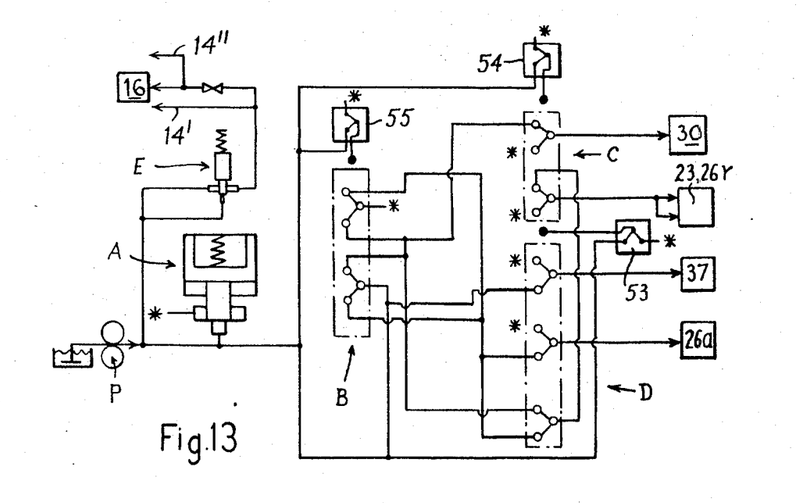
FIG. 13 is the diagrammatic layout of a control system similar to that of FIG. 7.

FIG. 13 is a diagrammatic layout of a control system generally similar to that of FIG. 7, but with revised interconnections enabling simpler forms of valve members B,C, and D to be employed. Using the circuit shown in FIG. 13, the supply of pressurised oil to the front clutch 37, rear clutch 23, the front servo 26 and the rear servo 30, to engage the various drive ratios is the same as that previously set out with regard to FIG. 7. The line 14" is connected to an oil cooler.

Figure 14:
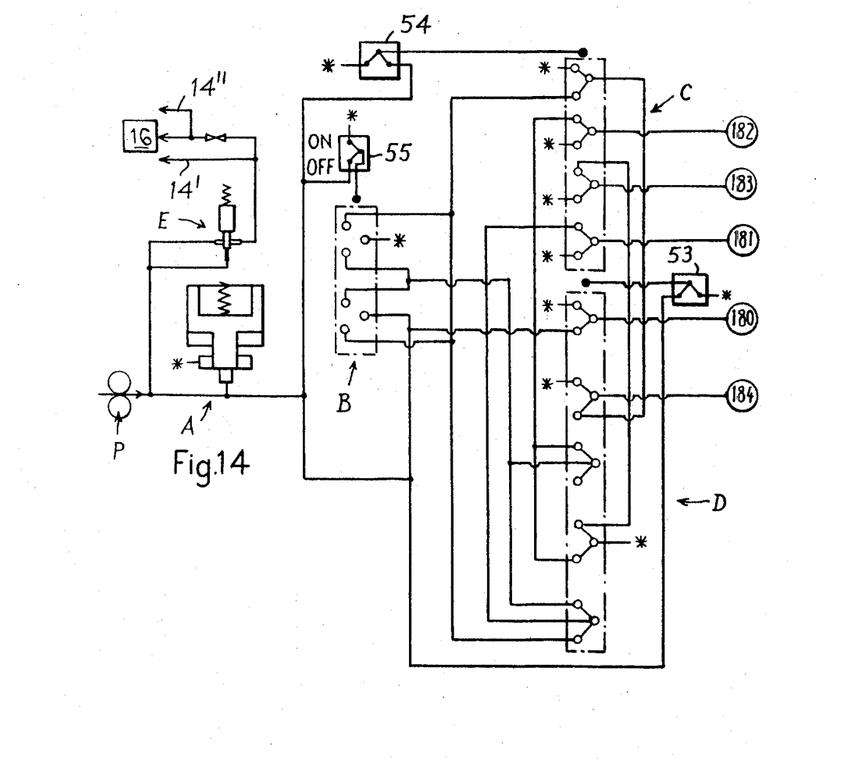
FIG. 14 shows a variation of FIG. 13.

FIG. 14 shows a variation of FIG. 13, in which the valve members B,C and D and their interconnections are arranged to control the friction-engaging elements of an automatic transmission capable of providing neutral, reverse and four forward drive ratios. Such a transmission is well known in the art, and will, therefore, not be described herein. The friction-engaging elements of this transmission comprise a forward clutch 180, a direct clutch 181, a reverse brake operated by a servo 182, second gear brake operated by servo 183 and third gear brake operated by servo 184. The forward clutch 180, direct clutch 181, and servo 182 may be considered to be equivalent to the front clutch 37, rear clutch 23 and rear servo 30 of FIG. 2, and the servos 183 and 184 may be considered to be equivalent to the front servo 26 of FIG. 2.

Using the circuit shown in FIG. 14, the supply of pressurised oil to the various clutches and brake servos to engage the different drive ratios is as follows:

| | |
|---|---|
| Neutral | Solenoid valves 53 and 54 energised. All clutches and servos drained. |
| Low (1st) | Solenoid valves 53 and 55 energised. Forward clutch 180 engaged. |
| Intermediate (2nd) | Solenoid valves 54 and 55 energised. Forward clutch engaged as above, and second gear brake servo 183 engaged. |
| Intermediate (3rd) | Solenoid valve 53 energised. Forward clutch and third gear brake servo 184 engaged. |
| Direct (4th) | Solenoid valve 54 energised. Forward clutch and direct clutch 181 engaged. |
| Reverse | All solenoid valves energised. Direct clutch 181 and reverse brake servo 182 engaged. |

We claim:

1. For an automatic transmission including a frictionengaging element operable to change the drive ratio of the transmission, and a supply of pressurized fluid connected to the friction-engaging element, the friction-engaging element being actuated to effect a ratio change in dependence upon the supply of fluid thereto from said supply, a control system including a fluid-pressure actuated fluid-control valve having a valve housing, a cavity in said valve housing, a valve member located in said housing and movable therein, and fluid passage means connectable to said friction-engaging element and pressurized fluid supply, said valve member being movable within with cavity between first and second positions, at one of which positions the valve member allows pressurized fluid to pass through said passage means to operate the friction-engaging element of the transmission in one direction, and at the other position the valve member vents the fluid to operate the friction-engaging element in the opposite direction, the control system further including an electrical solenoid-operated fluid-control valve for actuating said fluid-pressure actuated valve, fluid passage means connecting said solenoid-operated valve to the cavity of said fluid-pressure actuated valve, said solenoid-operated valve being operable to modify the pressure of pressurized fluid acting on said movable valve member, thereby to move the valve member in at least one direction, and electrical circuit means connected to the solenoid of said solenoid-operated valve to actuate the latter, said circuit being operable to supply a train of electrical pulses to said solenoid for a period after initiation of a change of drive ratio, the circuit means being adapted to vary at least one characteristic of the pulses in the train in dependence upon at least one variable operating parameter.

2. A system according to claim 1, wherein the valve member is moved in the other direction by a spring.

3. A system according to claim 2, wherein two valve members are provided, biased apart to opposite ends of their travel by the spring which acts upon both valve members.

4. A system according to claim 3, wherein at least one of the valve members is moved by fluid pressure, when its respective solenoid valve passes pressurised fluid, into abutment with the other valve member.

5. A system according to claim 4, wherein the or each valve member is a spool valve, slidable in a bore, and having at least two cylindrical sealing lands with an intermediate waisted portion, thereby to open and close at least one port in the wall of the bore.

6. A system according to claim 5, wherein the or each valve member is divided transversely into two portions kept in abutment, thereby to accommodate slight irregularity in the bore or the valve member.

7. A system according to claim 6, wherein at least one of the sealing lands has a tapered portion joining the, or each, cylindrical land to the waisted portion, thereby to reduce the rate at which the port is closed or opened as the valve member moves.

8. For an automatic transmission including a friction engaging element operable to change the drive ratio of the transmission, and a fluid supply connected to the friction-engaging element, the friction-engaging element being actuated to effect a ratio change in dependence upon the supply of fluid thereto from said fluid supply, a control system including a solenoid-operated fluid-control valve operable to control the supply of fluid for operating the friction-engaging element of the transmission and thereby actuate the friction-engaging element to effect changes of drive ratio, and electrical circuit means connected to the solenoid valve and operable to supply a train of electrical pulses to the solenoid valve for a period after initiation of a change of drive ratio, at least one characteristic of the pulses in the train being variable in dependence upon variations in at least one variable operating parameter.

9. A system according to claim 8, wherein, at the end of the said period, the solenoid is supplied with continuous current if de-energized immediately before the said period, or is de-energized if supplied with continuous current immediately before the said period.

10. A system according to claim 9, wherein at least one of the group comprising the mark/space ratio, the frequency of the pulses and the duration of the period of theh pulses, is different on upward changes of ratio from downward changes of ratio.

11. A system according to claim 8, wherein the at least one variable pulse characteristic comprises at least one of the group comprising the mark/space ratio and the frequency of the pulses, which is varied in dependence on at least one variable operating parameter of an engine by which the system is driven, and wherein the period of the pulse train is preset and independent of the variable operating parameters of the engine.

12. A system according to claim 11, wherein the at least one parameter is at least one of the group comprising the speed, the torque, the throttle opening, and the manifold depression of the engine.

13. A system according to claim 12, wherein at least one of the group comprising the mark/space ratio and the frequency of the pulses is varied in dependence upon the speed of a load driven by the transmission system.

14. an automatic control system for use with an engine-driven automatic transmission which includes a friction-engaging element operable to change the drive ratio of the transmission, and a fluid supply connected to the friction-engaging element, the friction-engaging being actuated to effect a ratio change in dependence upon the supply of fluid thereto from said fluid supply, said control system including a solenoid valve operable to control the supply of fluid from said supply to the friction-engaging element of the transmission and thereby actuate the friction-engaging element to effect changes of drive ratio, and electrical circuit means connected to the solenoid of the solenoid valve and operable to supply a train of electrical pulses to the solenoid valve for a period after initiation of a change of drive ratio, at least one characteristic of the individual pulses in the train being varied in dependence upon variations in at least one variable operating parameter of the engine, whilst the period of the pulse train is preset and independent of variable operating parameters of the engine, said circuit means including a delay circuit operable to delay the supply of electricity to the solenoid valve or to delay the cutting off of the electricity from the solenoid valve after initiation of the change of drive ratio.

15. A system according to claim 14, wherein, upon a change of drive ratio, the supply of electricity to one solenoid valve is delayed after the supply of electricity is cut off from another solenoid valve.

16. A system according to claim 14, wherein the cutting off at the supply of electricity from one solenoid valve is delayed after the supply of electricity to another solenoid valve.

17. An atuomatic transmission incorporating a control system as claimed in claim 16, and arranged to provide a plurality of different drive ratios, and in which failure of the supply of electricity to any of the energised solenoid valves will cause any ensuing change of ratio to be to a ratio nearer direct drive.

18. A system according to claim 2, wherein the circuit means includes an oscillator circuit controlled by at least one variable operating parameter of an engine by which the transmission is driven, and operable to produce said pulses in the train, at least one of the group comprising the mark/space ratio and the frequency of the pulses produced by the oscillator circuit being varied in dependence upon said at least one variable operating parameter, the circuit means further including a monostable circuit connected to the oscillator circuit so as to control the period of the pulse train output of the oscillator circuit independently of variable operating parameters of the engine.

19. A system according to claim 11, wherein said circuit means includes a monostable circuit which determines the period of the pulse train, and an oscillator circuit connected to and controlled by the monostable circuit, and also controlled by signals derived from variations in said at least one variable operating parameter of the engine.

20. A system according to claim 14, wherein said circuit means includes a monostable circuit which determines the period of the pulse train, and an oscillator circuit connected to and controlled by the monostable circuit, and also controlled by signals derived from variations in said at least one variable operating parameter of the engine.

* * * * *